United States Patent
Zhao

(10) Patent No.: US 8,621,615 B2
(45) Date of Patent: Dec. 31, 2013

(54) BEHAVIOR-BASED TRAFFIC PROFILING BASED ON ACCESS CONTROL INFORMATION

(75) Inventor: Ye Zhao, Beijing (CN)

(73) Assignee: Juniper Networks, Inc., Sunnyvale, CA (US)

( * ) Notice: Subject to any disclaimer, the term of this patent is extended or adjusted under 35 U.S.C. 154(b) by 547 days.

(21) Appl. No.: 12/476,567

(22) Filed: Jun. 2, 2009

(65) Prior Publication Data
US 2010/0257580 A1    Oct. 7, 2010

(30) Foreign Application Priority Data
Apr. 3, 2009    (CN) .......................... 2009 1 0130365

(51) Int. Cl.
G06F 21/00    (2006.01)
(52) U.S. Cl.
USPC ............. 726/22; 370/310; 370/252; 713/156; 713/189; 709/218; 709/223
(58) Field of Classification Search
USPC ...................................................... 726/22, 26
See application file for complete search history.

(56) References Cited

U.S. PATENT DOCUMENTS

| | | | |
|---|---|---|---|
| 7,007,301 B2 * | 2/2006 | Crosbie et al. ................... | 726/23 |
| 7,174,566 B2 * | 2/2007 | Yadav ............................. | 726/26 |
| 7,222,366 B2 * | 5/2007 | Bruton et al. ................... | 726/23 |
| 7,296,070 B2 * | 11/2007 | Sweeney et al. .............. | 709/224 |
| 7,322,044 B2 * | 1/2008 | Hrastar ........................... | 726/22 |
| 7,324,804 B2 * | 1/2008 | Hrastar et al. ................ | 455/410 |
| 7,690,034 B1 * | 3/2010 | Sallam ............................. | 726/22 |
| 2002/0053033 A1 * | 5/2002 | Cooper et al. ................ | 713/201 |
| 2002/0124187 A1 * | 9/2002 | Lyle et al. ..................... | 713/201 |
| 2003/0149887 A1 * | 8/2003 | Yadav ........................... | 713/200 |
| 2003/0182580 A1 * | 9/2003 | Lee ................................. | 713/201 |
| 2004/0015579 A1 * | 1/2004 | Cooper et al. ................ | 709/223 |
| 2004/0025044 A1 * | 2/2004 | Day ............................... | 713/200 |
| 2004/0181690 A1 * | 9/2004 | Rothermel et al. ........... | 713/201 |
| 2004/0199535 A1 * | 10/2004 | Zuk ................................ | 707/102 |
| 2005/0018618 A1 * | 1/2005 | Mualem et al. ............... | 370/252 |
| 2005/0044406 A1 * | 2/2005 | Stute ............................. | 713/201 |
| 2005/0193427 A1 * | 9/2005 | John .................................. | 726/1 |
| 2005/0268113 A1 * | 12/2005 | Mahone et al. ............... | 713/189 |
| 2006/0117386 A1 * | 6/2006 | Gupta et al. ..................... | 726/23 |
| 2008/0034424 A1 * | 2/2008 | Overcash et al. ............... | 726/22 |
| 2008/0071728 A1 * | 3/2008 | Lim ................................. | 707/1 |

OTHER PUBLICATIONS

Histogram-Based Traffic Anomaly Detection| http://www.csg.ethz.ch/people/dimitroc/papers/TNSM-I8-P0271.pdf|Jun. 2009| Kind et al.*
Cisco™, "Cisco IOS Flexible NetFlow" http://www.cisco.com/en/US/prod/collateral/iosswrel/ps6537/ps6555/ps6601/ps6965 1prod_qas0900aecd804be091.html, Dec. 2008, 5 pages.

(Continued)

Primary Examiner — Mahfuzur Rahman
(74) Attorney, Agent, or Firm — Harrity & Harrity, LLP

(57) ABSTRACT

A method includes receiving one or more of user information, role information, or authorization information associated with a user accessing a network, selecting a traffic flow to monitor that is associated with the one or more of user information, role information, or authorization information, monitoring the traffic flow, determining whether an anomaly exists with respect to the traffic flow based on a traffic behavior pattern associated with the one or more of user information, role information, or authorization information, and performing a security response when it is determined that the anomaly exists.

16 Claims, 10 Drawing Sheets

(56) References Cited

OTHER PUBLICATIONS

Rebecca Bace, "An Introduction to Intrusion Detection & Assessment", from Infidel, Inc. for ISCA™, Mar. 1999, 38 pages.
Website: http://www.ietf.org/html.charter/ipfix-charter.html, Apr. 12, 2013 (Print Date), 1 page.
"Monitoring J-Flow Statistics", http://www.juniper.net/techpubs/software/erx/junose90/swconfig-ip-services/html/ip-jflow-stats-config6.html, Apr. 12, 2013 (Print Date), 6 pages.
"Market Brief: Gain Network Visibility and Internal Security Using Netflow™", Stealth Watch by Lancope, 2008, 2 pages.
Yiming Gong, "Identifying P2P users using traffic analysis", http://www.securityfocus.com/infocus/1843, Jul. 20, 2005 (Created), Nov. 2, 2010.(Updated), 7 pages.
Yiqun Liu, Rongwei Gen, Min Zhang, Shaoping Ma, Liyun Ru, "Identifying Web Spam with User Behavior Analysis", AIR Web '08, Apr. 22, 2008, Beijing, China, 8 pages.
Website: Lancope (http://www.lancope.com/), Apr. 12, 2013 (Print Date), 1 page.

* cited by examiner

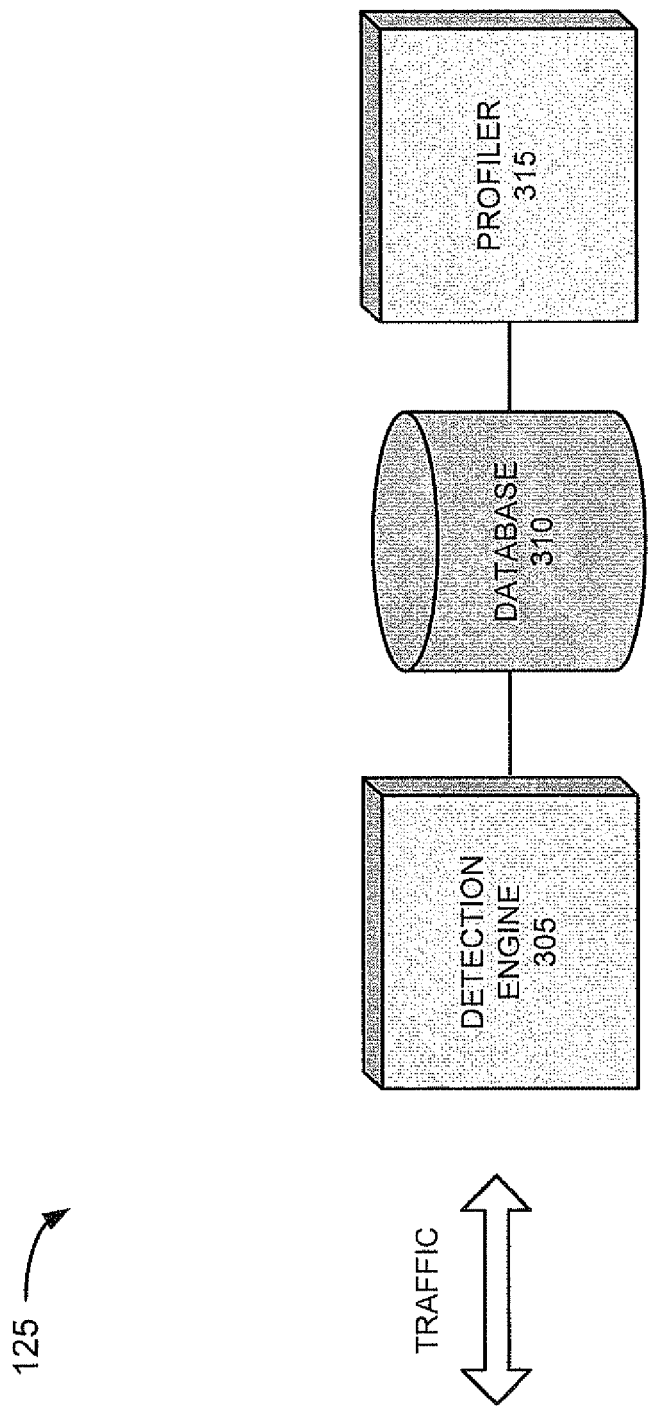

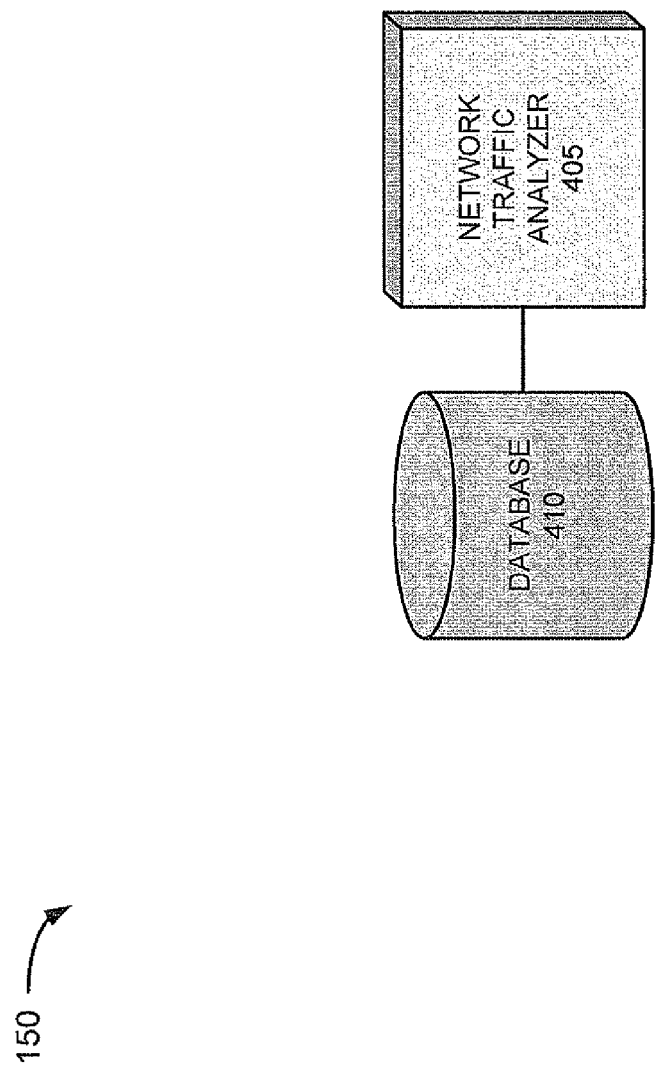

| TRAFFIC PROFILE TABLE 415 | | | |
|---|---|---|---|
| USER INFORMATION 420 | ROLE INFORMATION 425 | AUTHORIZATION INFORMATION 430 | TRAFFIC BEHAVIOR PATTERN INFORMATION 435 |
| KEVIN SMITH | EMPLOYEE | AEIFIR | |
| TWT12598 | ADMINISTRATOR | 654C | |
| USER NAME = VISITOR | GUEST | ****** | |
| | | | |

BEHAVIOR-BASED TRAFFIC PROFILING BASED ON ACCESS CONTROL INFORMATION

BACKGROUND

Security devices, such as intrusion detection and prevention (IDP) devices, have become a key component in both service provider and enterprise networks. Mitigation is often achieved through the policies of the security solutions deployed in the network. The security policies dictate what traffic is and what traffic is not a threat, malicious, and/or an attack, by defining a series of characteristics that, when matched by the traffic, represent traffic that should be allowed or denied.

SUMMARY

According to one implementation, a method, performed by a device, may include receiving, by the device, one or more of user information, role information, or authorization information associated with a user accessing a network, selecting, by the device, a traffic flow to monitor that is associated with the one or more of user information, role information, or authorization information, monitoring, by the device, the traffic flow, determining, by the device, whether an anomaly of traffic behavior exists with respect to the traffic flow based on a traffic behavior pattern associated with the one or more of user information, role information, or authorization information, and performing, by the device, a security response when it is determined that the anomaly exists.

According to another implementation, a network device may be configured to receive one or more of user information, role information, or authorization information associated with a network access of a user, select a traffic flow to monitor that is associated with the one or more of user information, role information, or authorization information, store a traffic behavior pattern corresponding to the one or more of user information, role information, or authorization information, based on one or more previous network accesses by the user, compare traffic flow information, associated with the traffic flow, with information associated with the traffic behavior pattern, determine that an anomaly of traffic behavior exists when the traffic flow differs from the information associated with the traffic behavior pattern, and perform a security response when it is determined that the anomaly of traffic behavior exists.

According to still another implementation, a computer-readable medium may have stored thereon instructions, executable by at least one processor. The computer-readable medium may include one or more instructions for receiving one or more of user information, role information, or authorization information associated with a network access by a user, one or more instructions for selecting a traffic flow to monitor, where the traffic flow is associated with the network access, one or more instructions for monitoring the traffic flow, one or more instructions for determining whether an anomaly of traffic behavior exists with respect to the traffic flow by comparing the traffic flow with a traffic behavior pattern associated with the one or more of user information, role information, or authorization information, and one or more instructions for performing a security response when it is determined that the anomaly exists.

According to still another implementation, a network device may include means for receiving one or more of user information, role information, or authorization information associated with a granted network access to a user, means for selecting a traffic flow resulting from the granted network access, means for monitoring the selected traffic flow, means for receiving a traffic behavior pattern that is associated with the one or more of user information, role information, or authorization information, means for comparing information associated with the selected traffic flow with the traffic behavior pattern, means for determining whether an anomaly of traffic behavior exists based on the comparing, and means for providing a security response when it is determined that the anomaly of traffic behavior exists.

According to still another implementation, a device may be configured to receive traffic flow information, construct a traffic profile associated with one or more of user information, role information, or authorization information relating to a granted network access, update a traffic behavior pattern associated with the one or more of user information, role information, or authorization information based on the traffic profile, where the traffic behavior pattern includes values or ranges of values indicative of non-deviant traffic behavior, and provide the updated traffic behavior pattern to another device.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 3 is a diagram illustrating exemplary functional components of the security device depicted in FIGS. 1A and 1B;

FIG. 4A is a diagram illustrating exemplary functional components of the database depicted in FIGS. 1A and 1B;

DETAILED DESCRIPTION

Figure 1A:
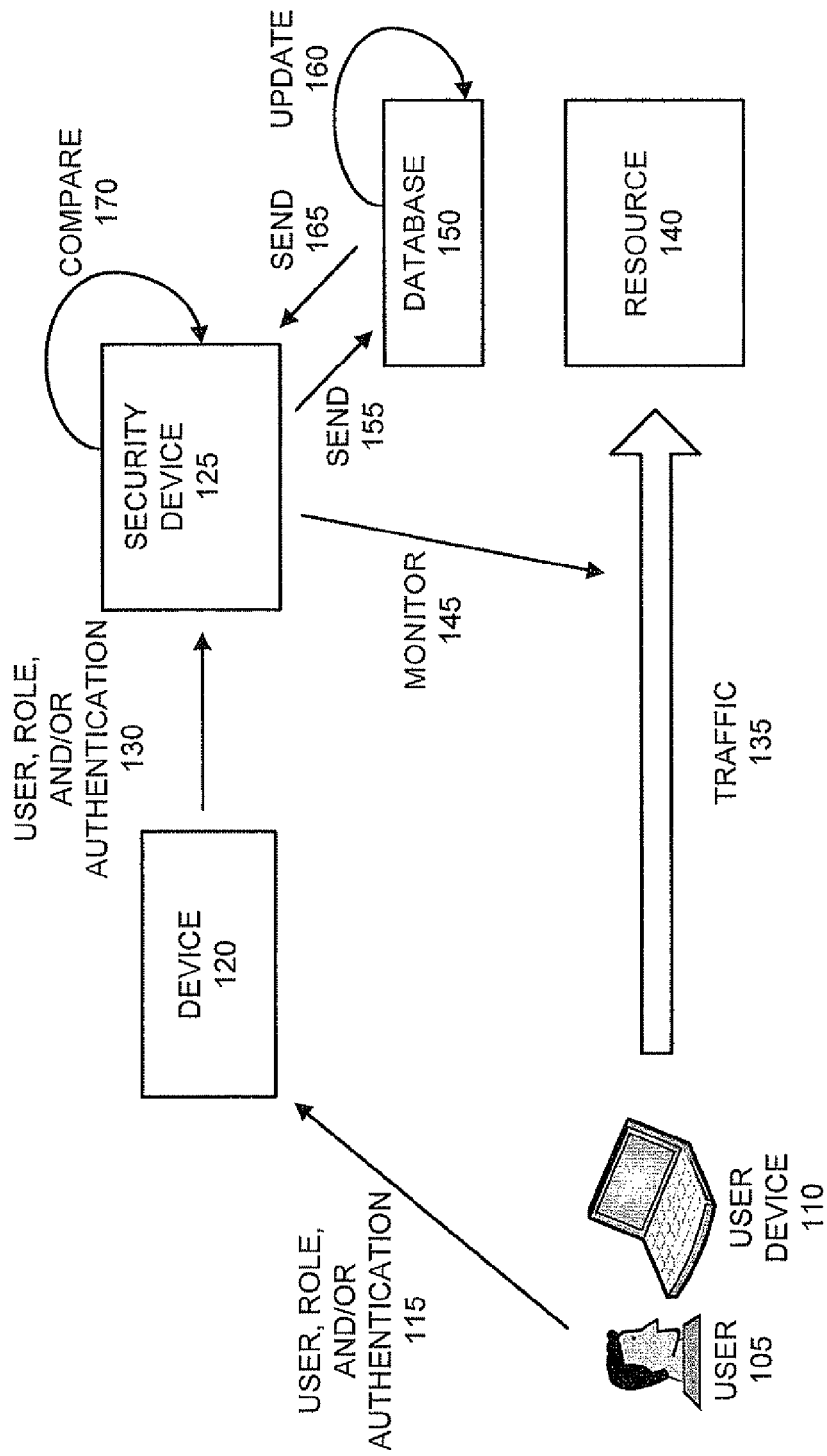
FIG. 1A is a diagram illustrating an overview of exemplary embodiments described herein.

The following detailed description refers to the accompanying drawings. The same reference numbers in different drawings may identify the same or similar elements. Also, the following description does not limit the invention. Instead, the scope of the invention is defined by the appended claims and equivalents.

The term "user information," as used herein, is intended to be broadly interpreted to include, for example, a user's name, a string that includes a portion of the user's name, a user identifier (e.g., a string), or the like. The term "string," as used herein, is intended to be broadly interpreted to include (one or more of) letters, numbers, symbols, or some combination of letters, numbers, and/or symbols.

The term "role information," as used herein, is intended to be broadly interpreted to include, for example, a user's status, a user's role, a job title, an access level, or the like. A user may have more than one role.

The term "authorization information," as used herein, is intended to be broadly interpreted to include, for example, information that uniquely identifies a user and/or information that is provided by the user to access a network. While user information and/or role information may correspond to authorization information, authorization information may include information, other than user and/or role information. For example, authorization information may include password information, log-in information, authorization codes, credential information, and the like.

Embodiments described herein provide methods, devices, and systems that may utilize user information, role information, and/or authorization information to select and monitor traffic flows, and detect deviations or anomalies based on traffic behavior patterns associated with the user information, role information, and/or authorization information. It will be appreciated that use, role, and/or authorization information is typically not conveyed in a traffic flow or provided by, for example, a router or a switch. Thus, security devices that monitor traffic flows do not have this type of information. Accordingly, some techniques, which monitor traffic flows and detect deviations or anomalies, are based on content of traffic, source address, destination address, transport layer protocol, source port, and destination port. In an Internet Protocol-based network this information corresponds to a source (IP) address (SIP), destination IP address (DIP), transport layer protocol (PROT), source port (SPORT), and destination port (DPORT) (sometimes referred to as a 5-tuple (SIP, DIP, PRO, SPORT, DPORT)). Still, in other techniques, security devices that monitor traffic flows and detect deviations or anomalies are based on the 5-tuple information, as well as other information, such as, ingression interface, type of service (TOS), quality of service (QOS), timestamps, and number of packets/bytes of a traffic flow.

In one implementation, a security device may receive user, role, and/or authorization information associated with a network access request by a user and a network access grant. The security device may detect and monitor a traffic flow associated with the user, role and/or authorization information, resulting from the granted network access. Thereafter, the security device may recognize a deviation or an anomaly of traffic behavior by comparing the information associated with the monitored traffic flow to an existing traffic behavior pattern. In one implementation, the existing traffic behavior pattern may correspond to a history of traffic behavior associated with the user, role, and/or authorization information. In other implementations, the existing traffic behavior pattern may correspond to information created by a network administrator and considered normal or non-deviant. When the comparison reveals that a deviation or an anomaly exists, the security device may then provide an appropriate security response (e.g., closing the session, dropping packets, etc.) to the recognized deviation or anomaly. The security response may be user-configured.

FIG. 1A is a diagram illustrating an overview of exemplary embodiments described herein. By way of example, user 105 may access a network with a user device 110. User 105 may provide user, role and/or authentication information 115 to a device 120. User 105 is authenticated and granted access to the network. Device 120 may share the user, role, and/or authentication information 130 with security device 125. Device 120 may also provide security device 125 with, for example, source network address information. In other implementations, device 120 may provide security device 125 with other information (e.g., source port, destination network address, etc.), in addition to, or instead of, source network address information.

User 105 may access resource 140. Security device 125 may utilize the source network address information, which is associated with the user, role, and/or authentication information 130, to select traffic 135 as a traffic flow to monitor 145.

Database 150 may store a traffic behavior pattern corresponding to the user, role, and/or authorization information. Security device 125 may send 155 the monitored traffic flow information to database 150. Database 150 may update 160 the traffic behavior pattern with the received traffic flow and send 165 the updated traffic behavior pattern to security device 125. Security device 125 may compare 170 the traffic behavior associated with traffic 135 with the updated traffic behavior pattern, both of which correspond to user, role, and/or authorization information 130. Based on this comparison, security device 125 may determine whether an anomaly exists. Security device 125 may then take appropriate measures (e.g., a security response) when it is determined that an anomaly or a deviation from the traffic behavior pattern exists. On the other hand, if it is determined that an anomaly or a deviation does not exist, security device 125 may continue to monitor traffic 135.

As an example, assume that user 105, with an administrator role, normally utilizes file transfer protocol (FTP). However, in this session (i.e., traffic 135), user 105, in the administrator role, begins web surfing. In such an instance, security device 125 may recognize this as an anomaly by comparing the traffic behavior pattern with the traffic behavior associated with traffic 135. Security device 125 may then take appropriate security measures.

Since the embodiments have been broadly described, variations exist. Accordingly, a detailed description of the embodiments is provided below.

Exemplary Environment

Figure 1B:
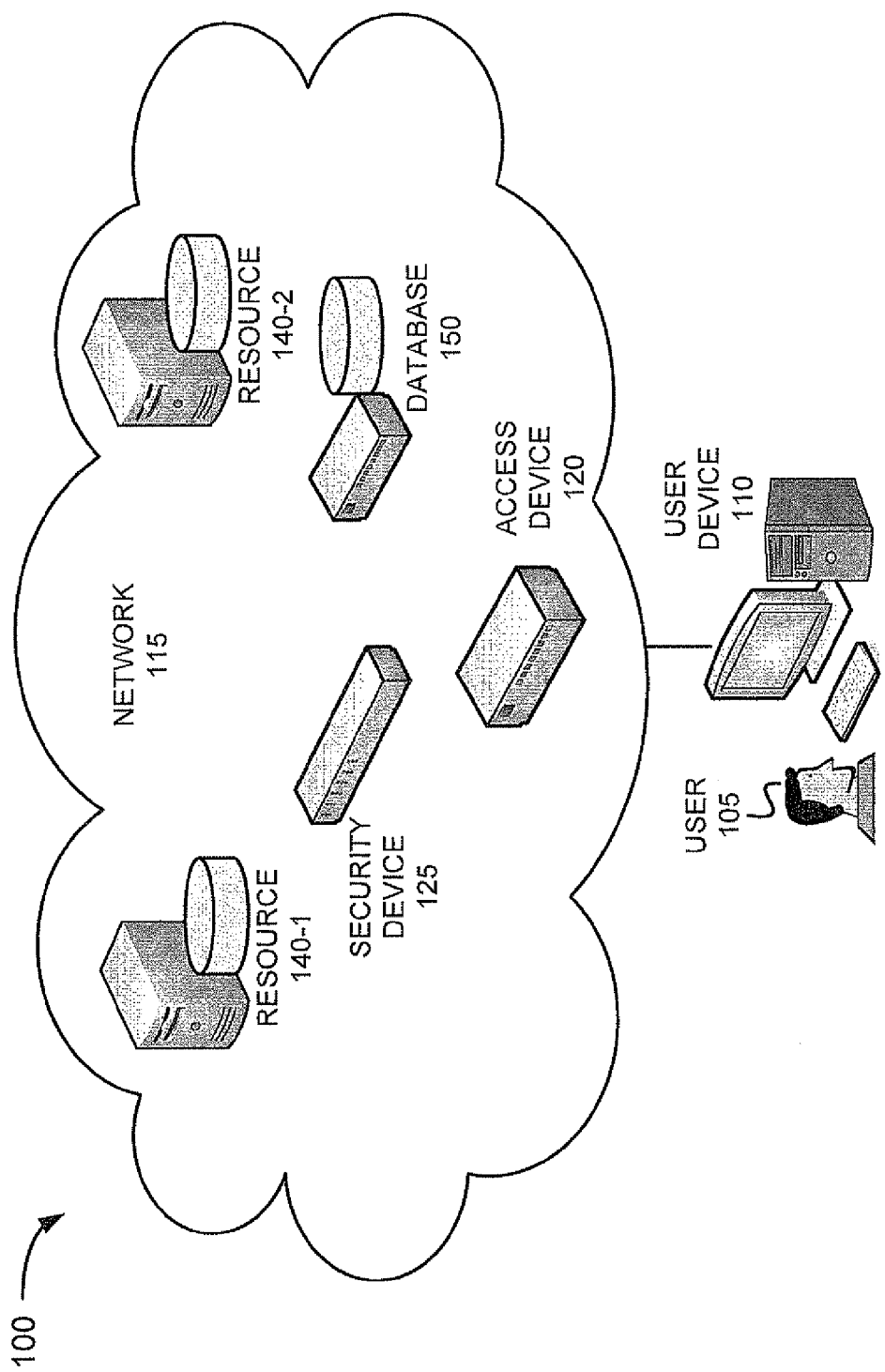
FIG. 1B is a diagram illustrating an exemplary environment in which methods, devices, and systems described herein may be implemented.

FIG. 1B is a diagram illustrating an exemplary environment 100 in which methods, devices, and systems described herein may be implemented. As illustrated in FIG. 1B, environment 100 may include user 105 and user device 110 communicatively coupled to a network 115. Network 115 may include an access device 120, security device 125, resources 140-1 and 140-2 (referred to generally as "resource 140"), and database 150. User 105, user device 110, access device 120, security device 125, resource 140, and database 150, depicted in FIG. 1B, may correspond to user 105, user device 110, device 120, security device 125, resource 140, and database 150 respectively, as previously illustrated and described with respect to FIG. 1A.

The number of devices and configuration in environment 100 is exemplary and provided for simplicity. In practice, environment 100 may include more, fewer, different, and/or differently arranged devices than those illustrated in FIG. 1. Also, some functions described as being performed by a particular device may be performed by a different device or a combination of devices. For example, in other embodiments, the functions associated with database 150 may be incorporated into security device 125. Environment 100 may include wired and/or wireless connections among the devices.

User device 110 may include a device having the capability to communicate with other devices, systems, networks, and/or the like. For example, user device 110 may correspond to a computer (e.g., a laptop, a desktop, a handheld computer), a personal digital assistant, a wireless telephone, an Internet-browsing device, or another type of communication device.

Network 115 may include one or multiple networks of any type. For example, network 115 may include a private network, a public network, a local area network (LAN), a metropolitan area network (MAN), a wide area network (WAN), the Internet, an intranet, a telephone network (e.g., the Public Switched Telephone Network (PSTN) or a cellular network), a satellite network, a computer network, and/or a combination of networks.

Access device 120 may include a device having the capability to communicate with other devices, systems, networks, and/or the like. For example, access device 120 may include an application authentication server, a policy server, an enforcement point, and/or some other type of access control device or a device (e.g., a switch, a gateway, a bridge) that may process and/or forward network traffic. Access device 120 may be enabled at layer 2, layer 3, and/or at higher layers. Access device 120 may manage access to network 115, including insider threats, guest user access, regulatory compliance, off-shoring and/or outsourcing. Access device 120 may obtain user information, role information, and/or authentication information, as well as other types of information, such as, for example, user device security state information, and/or location data. Access device 120 may define dynamic access control policies that are distributed within network 115. In some implementations, access device 120 may provide pre-authentication assessments, role mapping, and resource controls. Access device 120 may support various standards, such as Institute of Electrical and Electronics Engineers (IEEE 802.1X), Remote Authentication Dial In User Service (RADIUS), Internet Protocol Security (IPsec), or the like.

Security device 125 may include a device having the capability to communicate with other devices, systems, networks, and/or the like. For example, security device 125 may include a security device (e.g., an IDP device). Security device 125 may also behave as some other type of device (e.g., a router, a switch, or the like) that may process and/or forward network traffic. Security device 125 may operate in an in-line mode and/or in a passive mode. Security device 125 may monitor and/or collect network and application data with respect to other devices (e.g., user device 110, access device 120, resource 140) in network 115.

Security device 125 may provide various security measures, such as, for example, stateful signature detection (i.e., signature-based detection), protocol anomaly detection (e.g., protocol usage against published Request For Comments (RFCs)), traffic anomaly detection (e.g., heuristic rules may detect traffic patterns that suggest reconnaissance or attacks), response to denial of service (DOS) attacks, Internet Protocol (IP) spoofing detection, and/or layer 2 attack detection. Security device 125 may support various active responses to an attack or threat detected, such as for example, dropping a packet, closing a connection, closing a client, closing a server, closing both a client and a server, and the like, as well as passive responses, such as, for example, logging information and a transport control protocol (TCP) reset.

Security device 125 may provide other types of services, such as, for example, role-based administration and/or domain-based administration (e.g., to enable a logical separation of devices, policies, reports, etc.). Security device 125 may also provide logging (e.g., collecting network traffic information, traffic pattern information, etc.), and reporting/notification (e.g., providing real-time reports). In one embodiment, security device 125 may include a profiler. The profiler may capture accurate and granular details associated with a traffic flow. An exemplary profiler is described in greater detail below.

Resource 140 may include a device that provides a service, data, and/or some other type of asset. For example, resource 140 may correspond to a Web server, a mail server, a data repository, or the like.

Database 150 may store and manage traffic profile information and traffic behavior pattern information. Database 150 may analyze and create traffic profiles based on traffic flow information received from security device 125. Database 150 may also update traffic behavior pattern information with traffic profile information.

While security device 125 may be implemented as different types of devices, in the following paragraphs, security device 125 will be described in terms of an IDP device.

Exemplary Device Architecture

Figure 2:
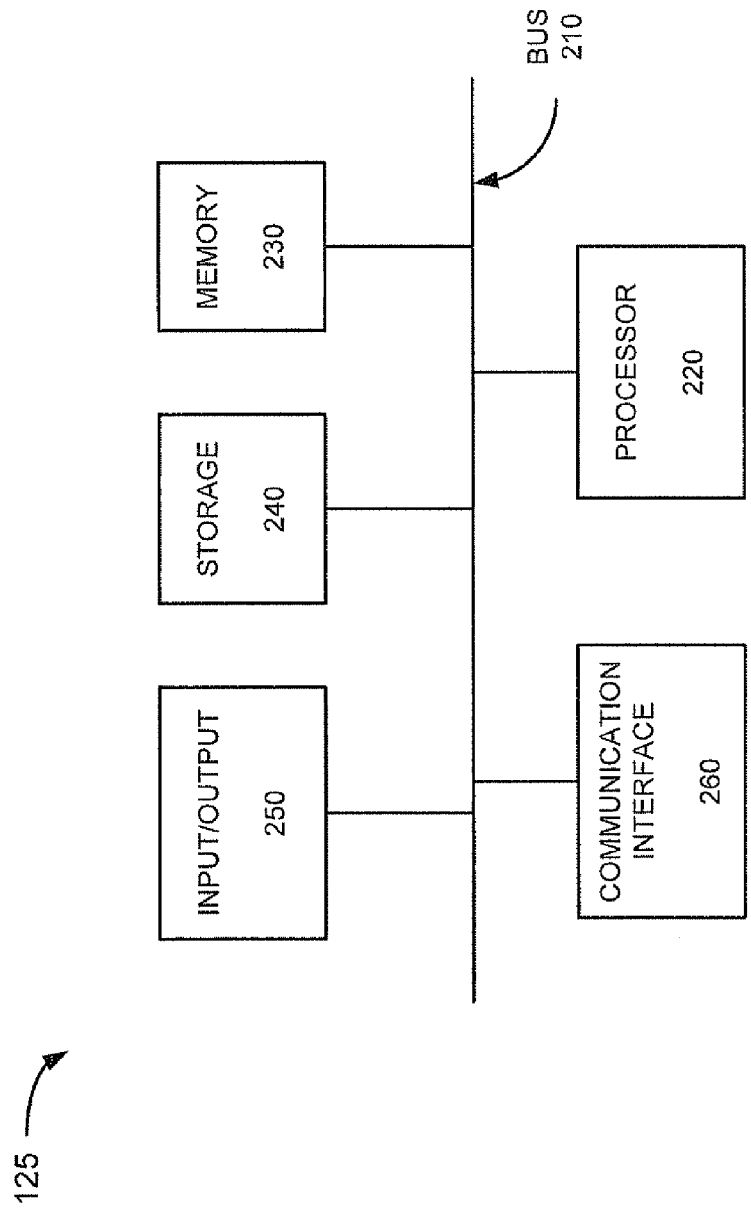
FIG. 2 is a diagram illustrating exemplary components of the security device depicted in FIGS. 1A and 1B.

FIG. 2 is a diagram illustrating exemplary components of security device 125. As illustrated, security device 115 may include, for example, a bus 210, a processor 220, a memory 230, storage 240, an input/output 250, and a communication interface 260.

Bus 210 may permit communication among the other components of security device 125. For example, bus 210 may include a system bus, an address bus, a data bus, and/or a control bus. Bus 210 may also include bus drivers, bus arbiters, bus interfaces, and/or clocks.

Processor 220 may interpret and/or execute instructions and/or data. For example, processor 220 may include a processor, a microprocessor, a data processor, a co-processor, a network processor, an application specific integrated circuit (ASIC), a controller, a programmable logic device, a field programmable gate array (FPGA), or some other processing logic that may interpret and/or execute instructions.

Memory 230 may store data and/or instructions. For example, memory 230 may include a random access memory (RAM), a dynamic random access memory (DRAM), a static random access memory (SRAM), a synchronous dynamic random access memory (SDRAM), a read only memory (ROM), a programmable read only memory (PROM), an erasable programmable read only memory (EPROM), an electrically erasable programmable read only memory (EEPROM), another type of dynamic or static memory, a cache, and/or a flash memory.

Storage 240 may store data, instructions, and/or applications. For example, storage 240 may include a hard disk (e.g., a magnetic disk, an optical disk, a magneto-optic disk, etc.), a compact disc (CD), a digital versatile disc (DVD), a floppy disk, a cartridge, a magnetic tape, a flash drive, or another type of computer-readable medium, along with a corresponding drive. The term "computer-readable medium" is intended to be broadly interpreted to include, for example, memory, storage or the like. A computer-readable medium may be implemented in a single device, in multiple devices, in a centralized manner, or in a distributed manner.

Input/output 250 may permit input to and output from security device 115. For example, input/output 250 may include a keyboard, a keypad, a mouse, a button, a switch, a microphone, voice recognition logic, a pen, a display, a port, or the like to permit input. Additionally, or alternatively, input/output 250 may include a display, a speaker, one or more light emitting diodes (LEDs), a port, or the like, to permit output.

Communication interface 260 may enable security device 125 to communicate with another device, a network, another system, and/or the like. For example, communication interface 260 may include a wireless interface and/or a wired interface, such as, an Ethernet interface, an optical interface, etc. Communication interface 260 may include a transceiver.

Security device 125 may perform operations and/or processes related to defining and analyzing traffic behavior patterns based on user, role, and/or authorization information, and to detecting deviations or anomalies associated with these traffic behavior patterns. According to an exemplary implementation, security device 125 may perform these operations and/or processes in response to processor 220 executing sequences of instructions contained in a computer-readable medium. For example, software instructions may be read into memory 230 from another computer-readable medium, such as storage 240, or from another device via communication interface 260. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Although, FIG. 2 illustrates exemplary components of security device 125, in other implementations, security device 125 may include additional, fewer, different, or differently arranged components than those illustrated in FIG. 2 and described herein. Additionally, or alternatively, one or more operations described as being performed by a particular component of security device 125 may be performed by one or more other components, in addition to or instead of the particular component. Additionally, it will be appreciated that other devices (e.g., user device 110, access device 120, resource 140, and/or database 150) in environment 100 may include the exemplary components illustrated in FIG. 2.

FIG. 3 is a diagram of exemplary functional components of security device 125. As illustrated in FIG. 3, security device 125 may include a detection engine 305, a database 310, and a profiler 315. The functional components illustrated in FIG. 3 may be implemented by hardware (e.g., processor 220) or a combination of hardware and software. While a particular number and arrangement of components are illustrated in FIG. 3, in other implementations, security device 125 may include fewer, additional, different, or differently arranged components than those illustrated in FIG. 3. Further, it will be appreciated that these functional components may be implemented in other devices (e.g., user device 110, access device 120, resource 140, and/or database 150) in environment 100.

Detection engine 305 may receive network traffic in the form of packets. While packets will be used in the description herein, implementations described herein apply to any form of a data unit, either in the form of a packet, a non-packet, a cell, a datagram, bits, bytes, etc. Detection engine 305 may perform various detection methods, such as, for example, pattern matching, signature matching, stateful pattern matching, and/or anomaly-based detection (e.g., protocol, traffic), necessary to identify attacks, threats, and/or malicious traffic.

Database 310 may store various types of information relating to the operation of security device 125. For example, database 310 may store signatures and/or heuristics for identifying anomalies, threats, attacks, and/or malicious traffic. Database 310 may store protocol decode information and policies.

Profiler 315 (or detection engine 305) may detect, monitor, and analyze traffic patterns. For example, profiler 315 may detect and monitor traffic that traverses network 115. Profiler 315 (or detection engine 305) may also compare a traffic behavior pattern with traffic flow information to determine whether an anomaly of traffic behavior exists. As described herein, in one implementation, profiler 315 may retrieve or receive a traffic behavior pattern from database 150. When it is determined that an anomaly exists, security device 125 may take appropriate security measures.

FIG. 4A is a diagram illustrating exemplary functional components of the database depicted in FIGS. 1A and 1B. The functional components illustrated in FIG. 4A may be implemented by hardware (e.g., processor 220) or a combination of hardware and software. While a particular number and arrangement of components are illustrated in FIG. 4A, in other implementations, database 150 may include fewer, additional, different, or differently arranged components than those illustrated in FIG. 4A. Further, it will be appreciated that these functional components may be implemented in other devices (e.g., user device 110, access device 120, security device 125, and/or resource 140) in environment 100.

Figure 4B:
FIG. 4B is a diagram of an exemplary traffic profile table.

Network traffic analyzer 405 may create a traffic profile based on the monitored traffic associated with a particular user, role, and/or authorization information. In one implementation, security device 125 may provide database 150 (e.g., network traffic analyzer 405) with the monitored traffic flow information. In other implementations, network traffic analyzer 405 may retrieve traffic flow information from security device 125. FIG. 4B is a diagram of an exemplary traffic profile table.

As illustrated in FIG. 4B, traffic profile table 415 may include a user information field 420, a role information field 425, an authorization information field 430, and a traffic behavior pattern information field 435. The information fields of traffic profile table 415 may be arranged according to an individual basis, a group basis, a domain basis, or the like.

User information field 420 may include user information. By way of example, user information field 420 may include a user's name (e.g., Kevin Smith), a string that identifies a user (e.g., TWT12598), or some other type of information (User name=Visitor).

Role information field 425 may include role information. By way of example, role information field 425 may include a user status (e.g., Employee), a job title (e.g., Administrator), or an access level (e.g., Guest).

Authorization information field 430 may include authorization information. By way of example, authorization information field 430 may include password information, log-in information, authorization codes, credential information, or the like.

Traffic behavior pattern information field 435 may include source address, destination address, source port, destination port, and transport protocol information (e.g., 5-tuple information (SIP, DIP, PRO, SPORT, DPORT)) and content information, which is typically conveyed in a traffic flow, as well as other information, such as, for example, ingression interface, TOS, QOS, timestamps, and number of packets/bytes of a traffic flow. This type of information may be utilized to create a traffic behavior pattern that may be associated with user, role, and/or authorization information. For example, the number of packets/bytes of a traffic flow may be used to formulate a traffic volume of use per session or over a period of time. In another example, the type of service information may be used to formulate a history of services normally utilized or accessed by a user, a role, and associated authorization information. In still another example, a source address and/or a destination address may be used to formulate a history regarding the user device that the user, the role, and/or the corresponding authorization information normally uses to access the network, or which destination devices the user, the role, and/or the corresponding authorization information normally accesses or utilizes. Thus, in general, traffic information captured by security device 125 (e.g., profiler 315) may be used to construct the traffic behavior pattern and associate this with user, role, and/or authorization information.

Although FIG. 4B illustrates an exemplary traffic profile table 415, in other implementations, traffic profile table 415 may include additional, different, or few information fields than illustrated in FIG. 4A and described herein.

Referring back to FIG. 4A, network traffic analyzer 405 may create a traffic behavior pattern based on traffic profile information associated with a particular user, role, and/or authorization information. Network traffic analyzer 405 may store the created traffic behavior pattern in database 410. Network traffic analyzer 405 may utilize various techniques to create the traffic behavior pattern, such as, for example, statistical analysis, averaging, etc., with respect to traffic flow information, such as, for example, content information, source address, source port, destination address, destination port, transport protocol (e.g., 5-tuple information), ingression interface, TOS, QOS, timestamps, and number of packets/bytes associated with traffic flow. The number of sessions needed to establish and/or create the traffic behavior pattern may be user-configurable. A traffic behavior pattern table may correspond to traffic profile table 415, however, the traffic behavior pattern table may include values or a range of values associated with traffic behavior pattern information 435 that are representative of normal traffic pattern behavior.

In an alternative implementation, the traffic behavior pattern may be created by, for example, an administrator or some other network personnel. For example, the administrator may determine values or a range of values that are considered normal or representative of non-deviant traffic behavior, and create a traffic behavior pattern table. The administrator may associate the traffic behavior pattern to a particular user, group of users, role(s), and/or authorization information. In either implementation, the traffic behavior pattern may equate to normal traffic behavior, which may be used to detect abnormal traffic behavior. It will be appreciated, that the term "traffic behavior pattern," as used herein, may correspond to a traffic behavior pattern created by database 150 (e.g., network traffic analyzer 405), a traffic behavior pattern created by, for example, a network administrator, and/or a combination of both.

Once the traffic behavior pattern is created, network traffic analyzer 405 may update the traffic behavior pattern with subsequent sessions (e.g., monitored traffic flows) associated with the particular user, role, and/or authorization information. For example, network traffic analyzer 405 may create a traffic profile based on the monitored traffic flow. Network traffic analyzer 405 may then update the traffic behavior pattern based on the traffic profile.

Exemplary Process

As described herein, security device 125 may utilize user, role, and/or authorization information to select and monitor traffic flows, and detect deviations or anomalies based on traffic behavior patterns associated with the user information, role information, and/or authorization information. It is recognized, that although, the description provides that user, role, and/or authorization information may be obtained by a device (e.g., device 120 or access device 120) and forwarded to security device 125, in other implementations, this functionality may be implemented within a single device. That is, security device 125 may obtain the user, role, and/or authorization information.

Figure 5A:
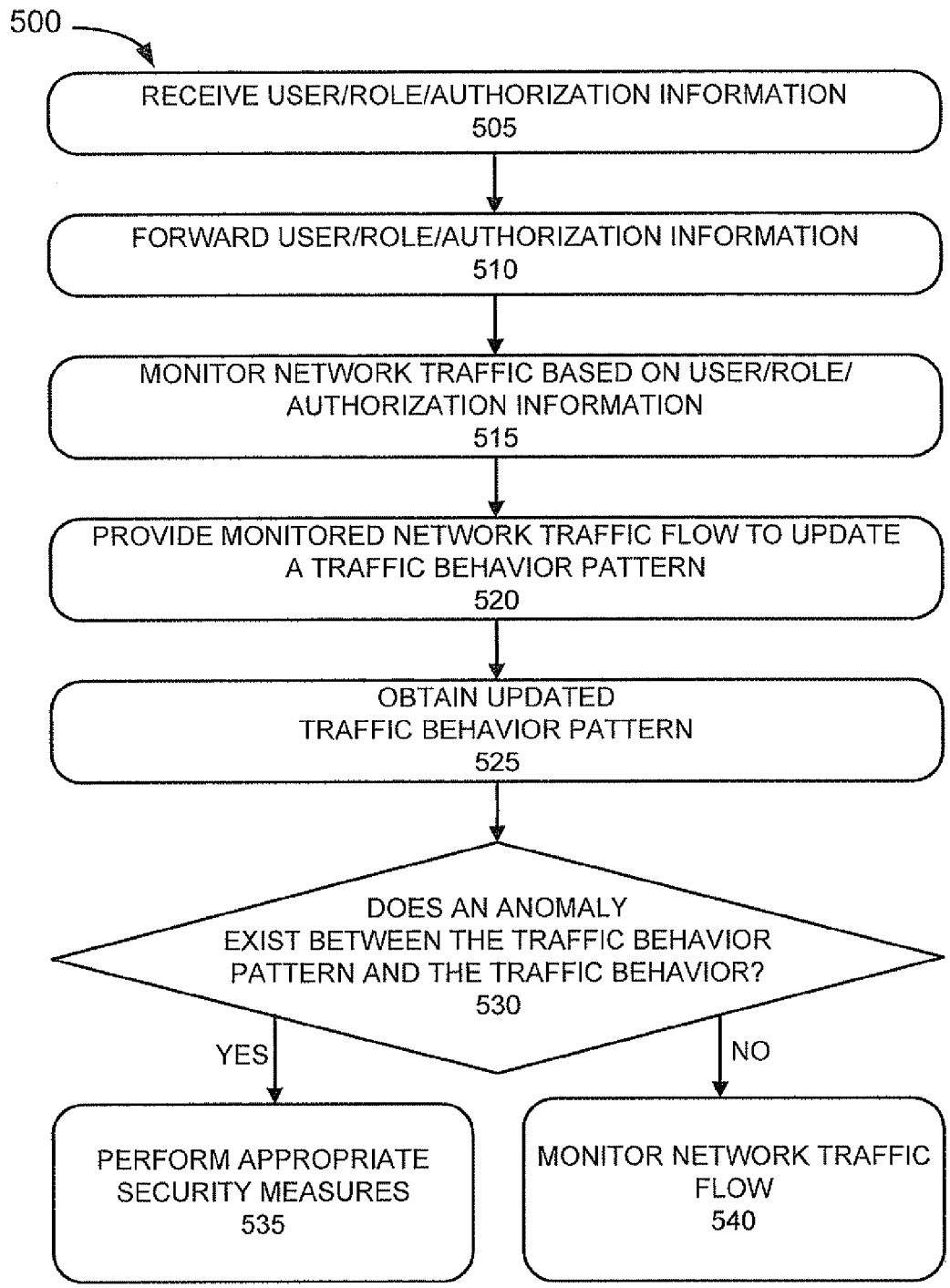
FIG. 5A is a flow diagram illustrating an exemplary process for detecting an anomaly of traffic behavior based on user information, role information, and/or authorization information.

FIG. 5A is a flow diagram illustrating an exemplary process 500 for selecting and monitoring traffic flows, and detecting deviations or anomalies based on traffic behavior patterns associated with user information, role information, and/or authorization information. Process 500 may be performed by hardware (e.g., processor 220 and/or some other type of logic), or a combination of hardware and software in security device 125. In another implementation, one or more operations associated with process 500 may be performed by another device in conjunction with security device 125. Process 500 will be described in conjunction with other figures. For purposes of discussion, it will be assumed that a traffic behavior pattern exists in database 150. This is in contrast in which an initial state of database 150 requires that the traffic behavior pattern be created versus updated.

Process 500 may begin with receiving user, role, and/or authorization information (block 505). For example, as illustrated in FIG. 1B, user 105 may attempt to access network 115. User 105 may be required to provide information to access device 120 before access is granted. This information may include user, role, and/or authorization information. Access device 120 may also obtain other types of information based on communication with user device 110, such as, for example, source network address, source port, destination network address, destination port, protocol (e.g., transport level), as well as other information, such as, for example, ingression interface, type of service (TOS), quality of service (QOS), timestamps, and number of packets/bytes of a traffic flow. For purposes of discussion, assume that access device 120 grants user 105 access to network 115.

Returning to FIG. 5A, user, role, and/or authorization information may be forwarded to the security device (block 510). Access device 120 may forward the received user, role, and/or authorization information to security device 125. Security device 125 may store the user, role, and/or authorization information in traffic behavior table 400 of database 310. Access device 120 may forward other information (e.g., source network address, source port, etc.) to security device 125. Security device 125 may also store this information in traffic behavior table 400.

Network traffic based on user, role, and/or authorization information may be monitored (block 515). Security device 125 (e.g., profiler 315) may detect, select, and/or monitor traffic from user 105 based on the user, role, and/or authorization information. For example, as illustrated in FIG. 1A, security device 125 may monitor traffic 135 associated with user 105 and user device 110. In one implementation, security device 125 may identify which traffic belongs to user 105 based on source network address, source port, etc., and/or the user, role, and/or authorization information provided by access device 120. Additionally, or alternatively, security device 125 may utilize information contained in traffic 135 to associate the user, role, and/or authorization information with traffic 135.

The monitored network traffic flow may be provided to update a traffic behavior pattern (block 520). Security device 125 may provide the monitored traffic flow to database 150. The monitored traffic flow may include the traffic flow information as well as user, role, and/or authorization information. In one implementation, security device 125 may transmit the monitored traffic flow to database 150. In other implementations, database 150 may retrieve the monitored traffic flow.

An updated traffic behavior pattern may be obtained (block 525). Security device 125 may obtain the updated traffic behavior pattern from database 150. The updated traffic behavior pattern may include information representative of normal traffic behavior associated with the user, role, and/or authorization information. In one implementation, security device 125 may retrieve the updated traffic behavior pattern from database 150. In other implementations, database 150 may transmit the updated traffic behavior pattern to security device 125.

It may be determined whether an anomaly exists between the traffic behavior pattern and the traffic behavior (i.e., corresponding to a current session). For example, profiler 315 may compare the traffic behavior pattern with the traffic behavior corresponding to the current session to determine whether an anomaly of traffic behavior exists.

In some implementations, profiler 315 may create a traffic behavior profile based on the traffic behavior corresponding to the current session, before a comparison between the traffic behavior pattern and the traffic behavior corresponding to the current session is made. In other implementations, profiler 315 may perform a comparison without further processing of the monitored traffic flow.

Profiler 315 may detect an anomaly based on the comparison. That is, the comparison may reveal that the traffic behavior associated with the monitored traffic flow deviates from "normal" behavior represented by the traffic behavior pattern for this particular user, role, and/or authorization information. By way of example, an anomaly could correspond to user 105 accessing network 115 from a different source address, user 105 utilizing a different service, user 105 exceeding a number of bytes uploaded and/or downloaded, etc.

As illustrated in FIG. 5A, if it is determined that an anomaly exists (block 530-YES), security device 125 may perform one or more appropriate security measures (block 535). These security measure(s) may be user-configurable. For example, security device 125 may consult database 310 to identify the appropriate security measures. As previously mentioned, security response may include closing the session, dropping packets, logging information, closing a client, closing a server, closing both the client and the server, etc. In one implementation, one or more security measures may be mapped based on the user, role, and/or authorization information. That is, the security policies of network 115 may be mapped to the user, role, and/or authorization information. Additionally, or alternatively, the security policies of network 115 may mapped to source address, source port, etc., associated with the monitored traffic flow.

On the other hand, if it is determined that an anomaly does not exist (block 530-NO), security device 125 may continue to monitor the network traffic flow (block 540). That is, security device 125 may continue to monitor the network traffic flow associated with the current session.

Although FIG. 5A illustrates an exemplary process 500, in other implementations, fewer, additional, or different operations may be performed.

Figure 5B:
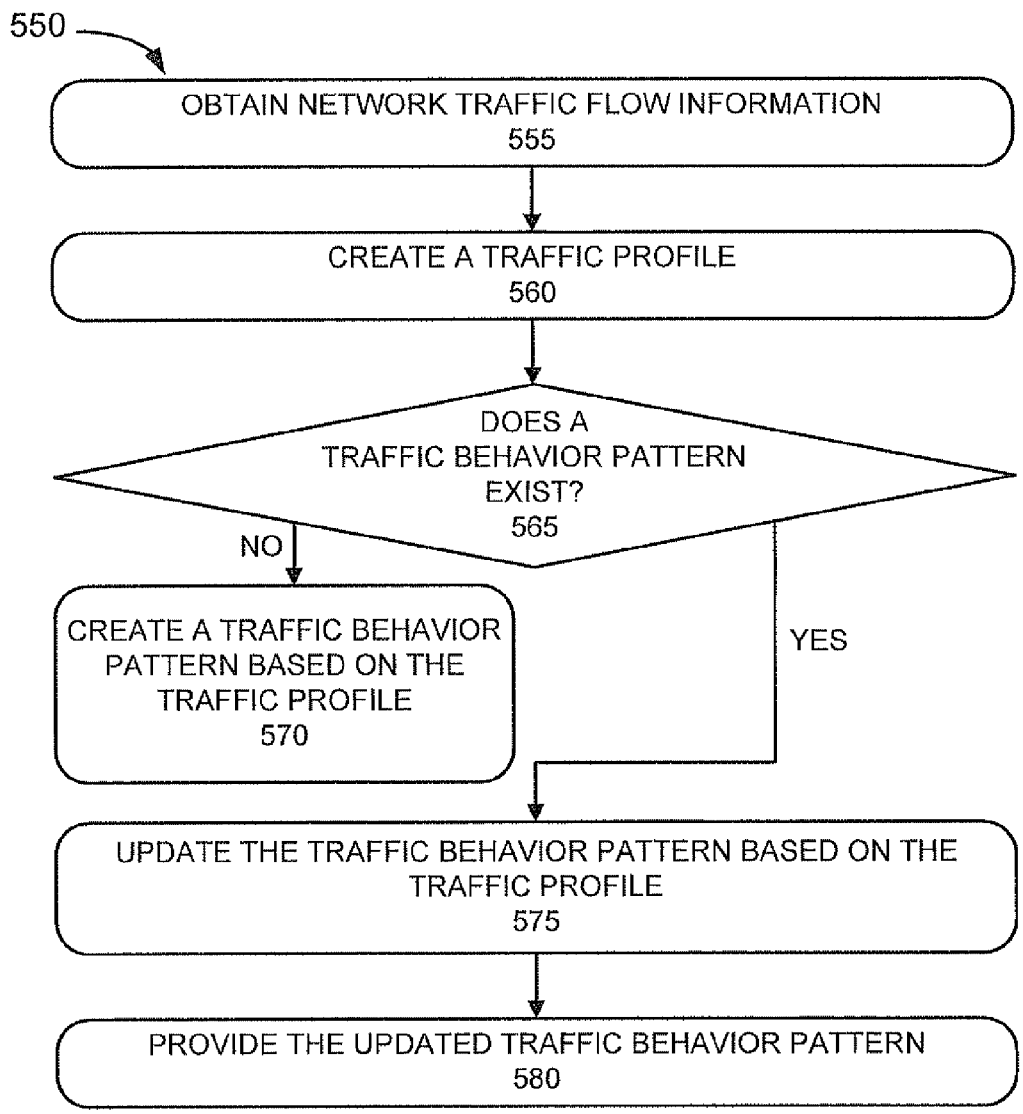
FIG. 5B is a flow diagram illustrating an exemplary process for creating and/or updating a traffic behavior pattern.

FIG. 5B is a flow diagram illustrating an exemplary process 550 for creating and/or updating a traffic behavior pattern. Process 550 may be performed by hardware (e.g., processor 220 and/or some other type of logic), or a combination of hardware and software in database 150. In another implementation, one or more operations associated with process 550 may be performed by another device (e.g., security device 125) in conjunction with database 150. Process 550 will be described in conjunction with other figures.

Process 550 may begin by obtaining network traffic flow information (block 555). Database 150 may obtain monitored traffic flow information. The monitored traffic flow information may include information associated with traffic 135 as well as user, role, and/or authorization information. In one implementation, database 150 may retrieve the monitored traffic flow information from security device 125. In other implementations, security device 125 may transmit the monitored traffic flow information to database 150.

A traffic flow profile may be created (block 560). Database 150 (e.g., network traffic analyzer 405 may create a traffic profile (e.g., traffic profile table) based on the monitored traffic flow information. For example, network traffic analyzer 405 may analyze the monitored traffic flow information to create the traffic profile.

It may be determined whether a traffic behavior pattern exists (block 565). For example, network traffic analyzer 405 may consult database 410 to determine whether a traffic behavior pattern exists with respect to the user, role, and/or authorization. In practice, a traffic behavior pattern may be created within a user-configured time period (e.g., a day, a week, a month, etc.). However, the number of sessions in which network traffic analyzer 405 considers sufficient to create a traffic behavior pattern, or considers that a traffic behavior pattern exists, may be a user-configurable parameter. It will be appreciated that the traffic behavior pattern may be created by, for example, a network administrator, as previously described. In this instance, block 565 may be omitted.

If it is determined that a traffic behavior pattern does not exist (block 565-NO), then network traffic analyzer 405 may create a traffic behavior pattern based on the traffic profile (block 570). The traffic behavior pattern may be associated with the user, role, and/or authorization information. Depending on the number of sessions and corresponding traffic behavior, network traffic analyzer 405 may utilize various techniques to create the traffic behavior pattern, such as, for example, statistical analysis, averaging, etc. The traffic behavior pattern may include values, range of values, parameters, etc. relating to traffic flow that represent or are indicative of normal traffic behavior.

If it is determined that the traffic behavior pattern does exist (block 565-YES), then network traffic analyzer 405 may update the traffic behavior pattern based on the traffic profile (block 575). For example, network traffic analyzer 405 may utilize the information associated with the traffic profile to update values, range of values, parameters, etc. relating to traffic flow.

The updated traffic behavior pattern may be provided (block 580). Database 150 (e.g., network traffic analyzer 405) may transmit the updated traffic behavior pattern to security device 125. In other implementation, security device 125 may retrieve the updated traffic behavior pattern (e.g., an updated traffic behavior pattern table) from database 410.

Although FIG. 5B illustrates an exemplary process 550, in other implementations, fewer, additional, or different operations may be performed.

EXAMPLES

Figure 6:
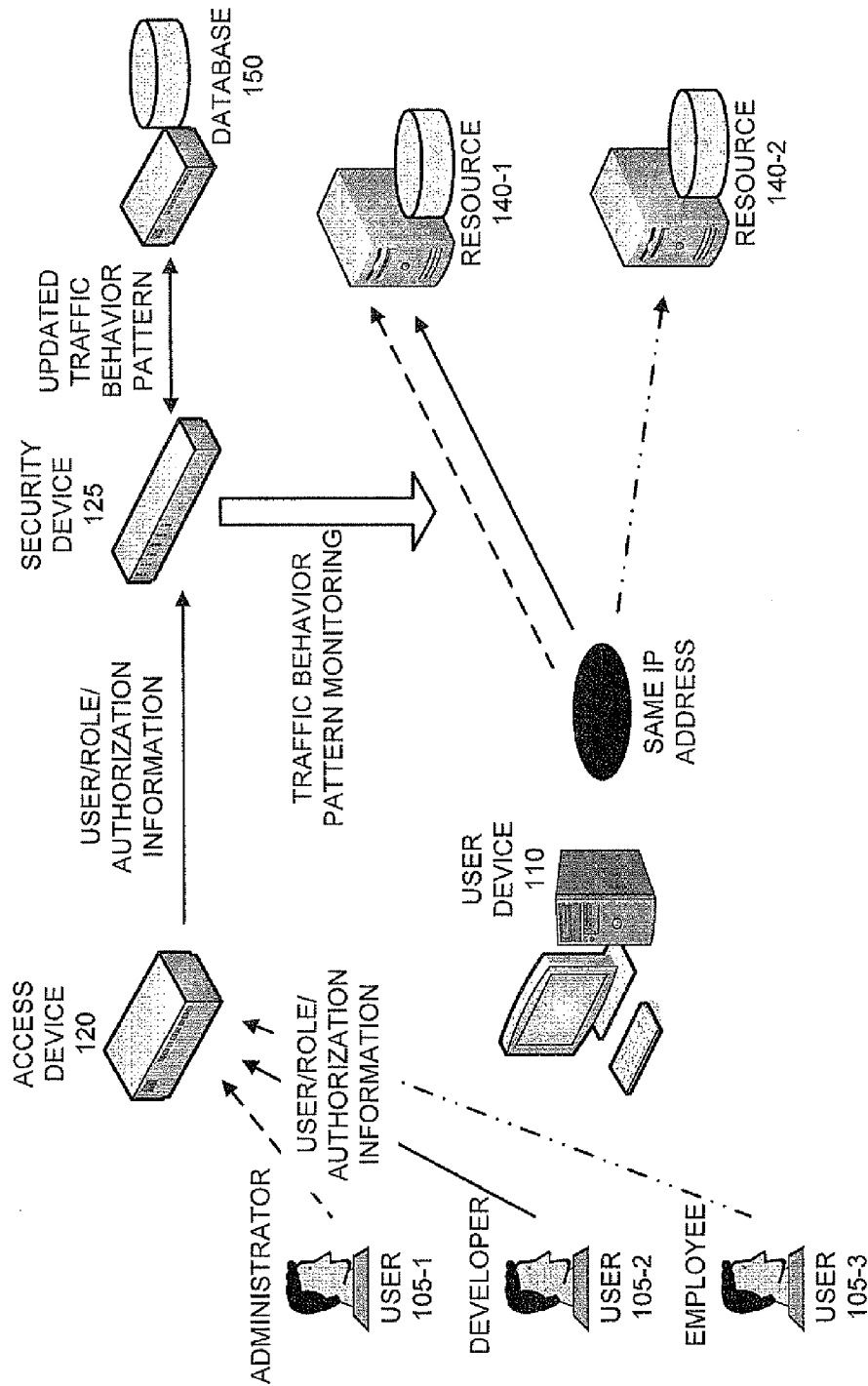
FIGS. 6 and 7 are diagrams illustrating exemplary scenarios in which the embodiments described herein may be applied.
Figure 7:
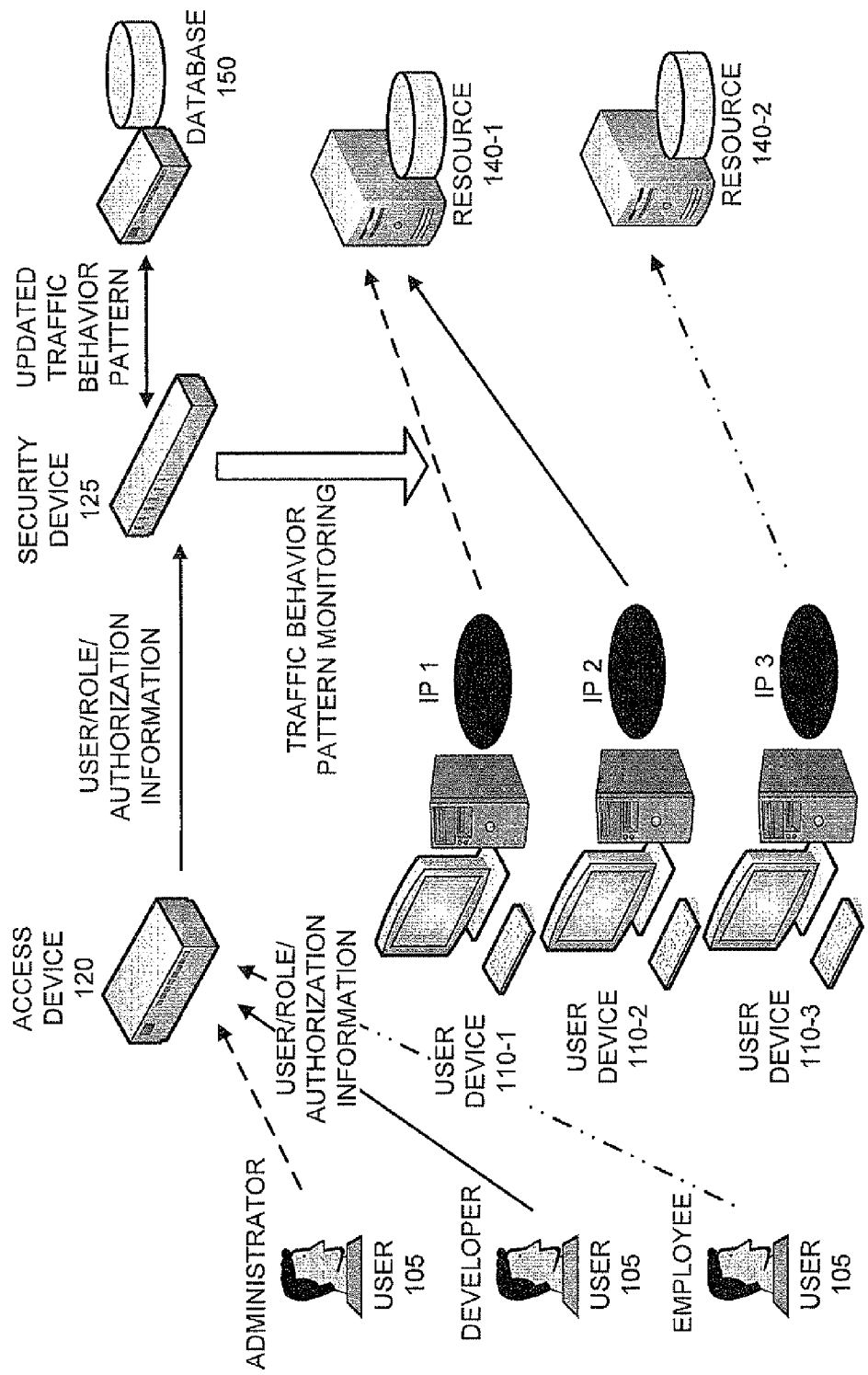

FIGS. 6 and 7 are diagrams illustrating examples of detecting, selecting and monitoring traffic flows, and detecting deviations or anomalies based on traffic behavior patterns associated with the user information, role information, and/or authorization information. Based on the detected deviations or anomalies, security device 125 may provide a finer granularity of security protection.

For example, as illustrated in FIG. 6, user 105-1 may have a role of an administrator, user 105-2 may have a role of a developer, and user 105-3 may have a role of an employee. Assume that users 105 access resource 140-1 or 140-2 at different times. Also, assume that user device 110 utilizes (or is assigned) the same source address (e.g., a same IP address) each time. As illustrated, each user 105 may provide user, role, and/or authorization information to access device 120.

Access device 120 may forward the received user, role, and/or authorization information to security device 125. Access device 120 may also forward the same source address to security device 125. Security device 125 may detect, select, and monitor the traffic and determine whether an anomaly exists, as previously described. Unlike existing techniques, which may view the traffic as coming from the same source (i.e., source address), and may require a deeper level of traffic inspection (e.g., 5-tuple level), security device 125 may provide a finer granularity of security with respect to the traffic since user, role, and/or authorization information is utilized. As a result, security device 125 may provide for appropriate security measures in response to detected deviations or anomalies of traffic behavior that may exist in such a scenario.

In another example, as illustrated in FIG. 7, a single user 105 may access resources 140-1 or 140-2, at different times, on different user devices 110 (i.e., user device 110-1, 110-2, and 110-3) with different role information (e.g., Administrator, Developer, and Employee). That is, user 105 may have three different roles. User devices 110-1, 110-2, and 110-3 may utilize (or be assigned) different source addresses (e.g., an IP address 1, an IP address 2, and an IP address 3). Access device 120 may forward the received user, role, and/or authorization information to security device 125. Access device 120 may also forward the different source addresses. Security device 125 may detect, select, and monitor the traffic and determine whether an anomaly exists, as previously described. Unlike existing techniques, which may view the separate traffic as coming from different sources, since the source addresses are different, and may correspondingly apply different security policies, security device 125 may provide a finer granularity of security with respect to the traffic since user, role, and/or authorization information is utilized. As a result, security device 125 may provide for appropriate security measures in response to detected deviations or anomalies of traffic behavior that may exist in such a scenario.

CONCLUSION

The foregoing description of implementations provides an illustration, but is not intended to be exhaustive or to limit the implementations to the precise form disclosed. Modifications and variations are possible in light of the above teachings or may be acquired from practice of the teachings. For example, security device 125 and database 150 may be implemented on a single device. Additionally, or alternatively, security device 125 may store a traffic behavior pattern in database 310. Additionally, or alternatively, once a traffic behavior pattern is created it may not be updated based on a traffic profile. For example, security device 125 may compare the monitored traffic flow with a stored traffic behavior pattern in database 310, without updating the traffic behavior pattern. Additionally, or alternatively, updates to the traffic behavior pattern may be performed by, for example, a network administrator, in addition to, or instead of traffic profile information. Additionally, or alternatively, a traffic behavior pattern may be updated with the monitored traffic flow only after security device 125 determines that the traffic behavior associated the monitored traffic flow is indicative of normal or non-anomalies traffic behavior. In this implementation, database 150 may not update the traffic behavior pattern with the monitored traffic flow before this determination is made.

In addition, while a series of blocks has been described with regard to the processes illustrated in FIG. 5A and FIG. 5B, the order of the blocks may be modified in other implementations. Further, non-dependent blocks may be performed in parallel.

Also, certain aspects have been described as being implemented as "logic" or a "component" that performs one or more functions. This logic or component may include hardware, such as a processor, microprocessor, an ASIC, or a FPGA, or a combination of hardware and software, such as a processor/microprocessor executing instructions stored in a computer-readable medium.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

The term "may" is used throughout this application and is intended to be interpreted, for example, as "having the potential to," "configured to," or "being able," and not in a mandatory sense (e.g., as "must"). The terms "a," "an," and "the" are intended to be interpreted to include one or more items. For example, a processor 302 may include one or more processors. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

Even though particular combination of features are recited in the claims and/or disclosed in the specification, these combinations are not intended to limit the disclosure of the invention. In fact, many of these features may be combined in ways not specifically recited in the claims and/or disclosed in the specification.

No element, block, or instruction used in the present application should be construed as critical or essential to the implementations described herein unless explicitly described as such.

What is claimed is:

1. A method comprising:
 determining, by a device, a plurality of traffic behavior patterns,
  the plurality of traffic behavior patterns being associated with a respective plurality of user roles associated with a user;
 monitoring, by the device, a traffic flow on a network,
  the monitoring of the traffic flow including:
   determining a user role, of the plurality of user roles, associated with the traffic flow,
   identifying, based on the determined user role, a traffic behavior pattern of the plurality of traffic behavior patterns, and
   identifying a traffic behavior associated with the traffic flow;
 comparing, by the device, the traffic behavior, associated with the traffic flow, and the traffic behavior pattern to form comparison results;
 determining, by the device and based on the comparison results, whether an anomaly is associated with the traffic flow,
  determining whether the anomaly is associated with the traffic flow including:

determining that the anomaly is associated with the traffic flow when the traffic flow is associated with a first network protocol that differs from a second network protocol associated with the traffic behavior pattern;

performing, by the device and when the anomaly is associated with the traffic flow, a security response; and updating, when the anomaly is not associated with the traffic flow, the traffic behavior pattern based on monitoring the traffic flow, the traffic behavior pattern not being updated based on monitoring the traffic flow when the anomaly is associated with the traffic flow.

2. The method of claim 1, where identifying determining the plurality of traffic behavior patterns includes:

receiving, by the device, one or more of the plurality of traffic behavior patterns from another device that differs from the device.

3. The method of claim 1, where determining the plurality of traffic behavior patterns includes identifying information associated with the user; and determining the plurality of traffic behavior patterns based on the information associated with the user.

4. The method of claim 3, where the received information associated with the user includes data associated with at least one of:

an identifier associated with the user, a status associated with the user, a job title associated with the user, an access level associated with the user, a password associated with the user, log-in data associated with the user, an authorization code associated with the user, or credential information associated with the user.

5. The method of claim 3, where identifying the information includes:

receiving, by the device, the information from at least one of:

a user device utilized, by the user, to access the network, or another device that regulates access, by the user, to the network.

6. The method of claim 1, further comprising:

storing security policies; and where the performing of the security response further includes:

selecting one of the security policies based on the anomaly; and performing the security response based on the selected one of the security policies.

7. The method of claim 1, where identifying the traffic behavior pattern further includes:

monitoring one or more other traffic flows associated with the user; and identifying the traffic behavior pattern further based on the monitoring of the one or more other traffic flows.

8. A network device, comprising:

a processor to:

determine a plurality of traffic behavior patterns, the plurality of traffic behavior patterns being associated with a respective plurality of user roles associated with a user;

determine, from the plurality of user roles, a user role associated with a traffic flow;

identify, based on the determined user role, a traffic behavior pattern, of the plurality of traffic behavior patterns, associated with the traffic flow;

compare traffic flow information, associated with the traffic flow, to the identified traffic behavior pattern;

detect an anomaly of traffic behavior associated with the traffic flow based on comparing the traffic flow information to the identified traffic behavior pattern, the processor, when detecting the anomaly, being further to:

detect the anomaly of traffic behavior associated with the traffic flow based on determining that the traffic flow is associated with a first network protocol that differs from a second network protocol associated with the traffic behavior pattern;

perform, when the anomaly is detected, a security response; and update, when the anomaly is not associated with the traffic flow, the traffic behavior pattern based on monitoring the traffic flow, the processor not updating the traffic behavior pattern, based on monitoring the traffic flow, when the anomaly is associated with the traffic flow.

9. The network device of claim 8, where the processor, when determining the plurality of traffic behavior patterns, is further to:

receive the plurality of traffic behavior patterns from another device.

10. The network device of claim 8, where the network device is associated with an intrusion, detection, and prevention device.

11. The network device of claim 8, where the traffic flow information includes data associated with one or more of:

a source address associated with the traffic flow, a source port associated with the traffic flow, a destination address associated with the traffic flow, a destination port associated with the traffic flow, a type of service associated with the traffic flow, a quality of service associated with the traffic flow, timestamp information associated with the traffic flow, or a quantity of packets or bytes associated with the traffic flow.

12. The network device of claim 8, where the processor is further to:

monitor the traffic flow; and obtain the traffic flow information based on monitoring the traffic flow.

13. The network device of claim 8, where the processor is further to:

receive at least one of a source address or a source port identifier associated with a network access associated with the user, and select the traffic flow, from a plurality of traffic flows, further based on the at least one of the source address or the source port identifier.

14. The network device of claim 8, where the processor, when identifying the traffic behavior pattern, is further to:

monitor one or more other traffic flows associated with the user, the one or more other traffic flows being different from the traffic flow; and determine the traffic behavior pattern based on the monitoring of the one or more other traffic flows.

15. A non-transitory computer-readable medium storing instructions, the instructions comprising:

one or more instructions which, when executed by a processor, cause the processor to acquire data associated with activities of a user on a network;

one or more instructions which, when executed by the processor, cause the processor to determine, based on the acquired data, a plurality of traffic behavior patterns associated with the user,
the plurality of traffic behavior patterns being associated with a respective plurality of user roles of the user;
one or more instructions which, when executed by the processor, cause the processor to monitor a traffic flow to produce monitoring results;
one or more instructions which, when executed by the processor, cause the processor to determine a user role, of the plurality of user roles, associated with the traffic flow;
one or more instructions which, when executed by the processor, cause the processor to identify, based on the determined user role, a traffic behavior pattern, of the plurality of traffic behavior patterns, associated with the traffic flow;
one or more instructions which, when executed by the processor, cause the processor to compare the monitoring results with the traffic behavior pattern to form comparison results;
one or more instructions which, when executed by the processor, cause the processor to determine, based on the comparison results, whether the traffic flow is associated with an anomaly of traffic behavior,
the one or more instructions to determine whether the traffic flow is associated with the anomaly of traffic behavior further including:
one or more instructions to determine that the traffic flow is associated with the anomaly of traffic behavior when the traffic flow is associated with a first network protocol that differs from a second network protocol associated with the traffic behavior pattern;
one or more instructions which, when executed by the processor, cause the processor to perform a security response when the traffic flow is associated with the anomaly; and
one or more instructions to update, when the traffic flow is not associated with the anomaly, the traffic behavior pattern based on information associated with the traffic flow,
the traffic behavior pattern not being updated based on the information associated with the traffic flow when the traffic flow is associated with the anomaly.

16. The non-transitory computer-readable medium of claim 15, the one or more instructions to identify the traffic behavior pattern further comprising:
one or more instructions to identify the traffic behavior pattern further based on monitoring one or more other traffic flows associated with the user.

* * * * *

UNITED STATES PATENT AND TRADEMARK OFFICE
CERTIFICATE OF CORRECTION

PATENT NO. : 8,621,615 B2  
APPLICATION NO. : 12/476567  
DATED : December 31, 2013  
INVENTOR(S) : Ye Kevin Zhao Page 1 of 1

It is certified that error appears in the above-identified patent and that said Letters Patent is hereby corrected as shown below:

In the Claims

Column 15, claim 2, line 14, following the word "where" delete "identifying";

Column 15, claim 4, line 24, following the words "where the" delete "received".

Signed and Sealed this
First Day of April, 2014

Michelle K. Lee
*Deputy Director of the United States Patent and Trademark Office*